United States Patent
Lee (10) Patent No.: US 10,282,328 B2
(45) Date of Patent: May 7, 2019

(54) APPARATUS HAVING DIRECT MEMORY ACCESS CONTROLLER AND METHOD FOR ACCESSING DATA IN MEMORY

(71) Applicant: SK hynix Inc., Gyeonggi-do (KR)

(72) Inventor: Joung-Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/641,946

(22) Filed: Jul. 5, 2017

(65) Prior Publication Data
US 2018/0129621 A1 May 10, 2018

(30) Foreign Application Priority Data
Nov. 7, 2016 (KR) .......................... 10-2016-0147452

(51) Int. Cl.
*G06F 13/28* (2006.01)
*G06F 13/16* (2006.01)

(52) U.S. Cl.
CPC .......... *G06F 13/28* (2013.01); *G06F 13/1673* (2013.01)

(58) Field of Classification Search
USPC ....................................... 710/52–57, 31, 310
See application file for complete search history.

(56) References Cited

U.S. PATENT DOCUMENTS

| | | | | | |
|---|---|---|---|---|---|
| 5,499,383 | A | * | 3/1996 | Yamasaki | G06F 13/28 710/22 |
| 5,870,627 | A | * | 2/1999 | O'Toole | G06F 13/28 710/22 |
| 2006/0155895 | A1 | * | 7/2006 | Matsuda | G06F 7/02 710/52 |
| 2009/0031054 | A1 | * | 1/2009 | Kato | G06F 13/385 710/22 |
| 2009/0276571 | A1 | * | 11/2009 | Benner | G06F 9/3824 711/118 |
| 2011/0138086 | A1 | * | 6/2011 | Kwon | G06F 13/28 710/26 |

FOREIGN PATENT DOCUMENTS

| KR | 1020090071934 | 7/2009 |
|---|---|---|
| KR | 1020140071135 | 6/2014 |

\* cited by examiner

*Primary Examiner* — Raymond N Phan
(74) *Attorney, Agent, or Firm* — IP & T Group LLP (57) ABSTRACT

Disclosed are a direct memory access (DMA) apparatus and method. The DMA apparatus may include memory, a buffer, a DMA controller suitable for setting group regions from which data of the memory is to be read, reading data of each odd-numbered group region in a first direction and writing the read data of each odd-numbered group region in the buffer in the first direction, and reading data of each even-numbered group region in the first direction and writing the read data of each even-numbered group region in the buffer in a second direction, and a read module suitable for reading the data of each odd-numbered group region written in the buffer in the second direction and reading the data of each even-numbered group region in the first direction.

19 Claims, 8 Drawing Sheets

APPARATUS HAVING DIRECT MEMORY ACCESS CONTROLLER AND METHOD FOR ACCESSING DATA IN MEMORY

CROSS-REFERENCE TO RELATED APPLICATION

The present application claims priority of Korean Patent Application No. 10-2016-0147452, filed on Nov. 7, 2016, which is incorporated herein by reference in its entirety.

BACKGROUND

1. Field

Exemplary embodiments of the present invention relate to an apparatus and method for accessing data stored in memory.

2. Description of the Related Art

Direct memory access (DMA) may be a function for transferring data from an input and/or output device to a memory or transferring data stored in the memory to the input and/or output device without the intervention of a system controller (e.g., a central processing unit (CPU) (or microprocessor)). In this case, the system controller may perform another function without involving access to the data. For example, if the data of the memory is to be accessed, the CPU may use about 80% of resources when accessing the data of the memory. If DMA is used, the CPU may use about 10-20% of the resources. Accordingly, if DMA is used, a system load which may be generated during multi-processing (e.g., when a file is stored in or read from a memory device, when a program or image that requires lots of the resources of a CPU is stored or when an edit task is performed) may be reduced.

A DMA operation is described below. When a CPU sends a memory access command to a DMA controller, the DMA controller may send a bus grant to the CPU such that the CPU may directly access a memory. The CPU may include an internal buffer for buffering accessed data when performing the DMA function.

When accessing data stored in the memory, the DMA controller may access the data in the direction in which the addresses of the memory increase. For example, a search engine may include the DMA controller and may search for data accessed by the DMA controller. In this case, if a search function is to be performed by accessing the data of an initial address of the memory, data accessed by the DMA controller may be stored in the internal buffer (e.g., a first-in-first-out (FIFO)). The search engine (e.g. a linear search module) may perform a search operation by reading data stored in the buffer from the beginning. In contrast, a search operation i.e., a backward search operation) for searching, by the search engine, data stored in the middle or last part of the memory (e.g. data stored in the middle or latter address location of the memory) may be performed according to a complicated procedure.

SUMMARY

Various embodiments are directed to a memory access apparatus and method capable of backward accessing data stored in memory.

Also, various embodiments provide an apparatus and method, wherein a search engine having a direct memory access (DMA) function is capable of searching for data by accessing data stored in memory forward or backward.

Also, various embodiments provide an apparatus and method, wherein a memory system including a high-capacity memory device may include a search engine capable of searching for data stored in a memory and the search engine is capable of searching for data by accessing data stored in a memory forward or backward using a direct memory access (DMA) function.

In an embodiment, a memory control apparatus for controlling a first memory under the control of a host may include a second memory, a processor suitable for providing a search request for data stored in second memory, and a search engine suitable for backward searching for the data stored in the second memory based on the data for the search request. The search engine includes a buffer, a direct memory access (DMA) controller suitable for setting group regions from which the data of the second memory is to be read in response to the search request, reading the data of each odd-numbered group region in a first direction and writing the read data of each odd-numbered group region in the buffer in the first direction, and reading the data of each even-numbered group region in the first direction and writing the read data of each even-numbered group region in the buffer in a second direction, and a linear search hardware module suitable for reading the data of each odd-numbered group region written in the buffer in the second direction, reading the data of each even-numbered group region written in the buffer in the first direction, analyzing the read data, and transmitting results of the search to the processor.

In an embodiment, a direct memory access (DMA) apparatus may include may include a memory, a buffer, a DMA controller suitable for setting group regions from which data of the memory is to be read, reading data of each odd-numbered group region in a first direction and writing the read data of each odd-numbered group region in the buffer in the first direction, and reading data of each even-numbered group region in the first direction and writing the read data of each even-numbered group region in the buffer in a second direction, and a read module suitable for reading the data of each odd-numbered group region written in the buffer in the second direction and reading the data of each even-numbered group region in the first direction.

In an embodiment, an operating method of a memory control apparatus including a second memory and controlling an operation of a first memory in response to a request from a host may include: a step of setting group regions from which data of the second memory is to be read based on the search request data of the second memory, a first access step of reading the data of a corresponding group region from the second memory in a first direction, writing the read data in the buffer in the first direction, and reading the data of an odd-numbered group region written in the buffer in a second direction if the corresponding group region is an odd-numbered group region, a second access step of reading the data of a corresponding group region from the second memory in the first direction, writing the read data in the buffer in the second direction, and reading the data of an even-numbered group written in the buffer in the first direction if the corresponding group region is an even-numbered group region, and a search step of analyzing the read data and transmitting a result of the search.

In an embodiment, an access method of a direct memory access (DMA) apparatus may include: a step of setting group regions from which data of memory is to be read, a first access step of reading the data of a corresponding group region from second memory in a first direction, writing the read data in a buffer in the first direction, and reading the data of the odd-numbered group region written in the buffer in a second direction if the corresponding group region is an odd-numbered group region, and a second access step of reading the data of a corresponding group region from the second memory in the first direction, writing the read data in the buffer in the second direction, and reading the data of an even-numbered group written in the buffer in the first direction if the corresponding group region is an even-numbered group region.

DETAILED DESCRIPTION

Various embodiments will be described below in more detail with reference to the accompanying drawings. Phe present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that the drawings are simplified schematics and as such are not necessarily drawn to scale. In some instances, various parts of the drawings may have been exaggerated in order to more clearly illustrate certain features of the illustrated embodiments.

It is further noted that in the following description, specific details are set forth for facilitating the understanding of the present invention, however, the present invention may be practiced without some of these specific details. Also, it is noted, that well known structures and/or processes may have only been described briefly or not described at all to avoid obscuring the present disclosure with unnecessary well known details.

It is also noted, that in some instances, as would be apparent to those skilled in the relevant art, an element (also referred to as a feature) described in connection with one embodiment may be used singly or in combination with other elements of another embodiment, unless specifically indicated otherwise.

Figure 1:
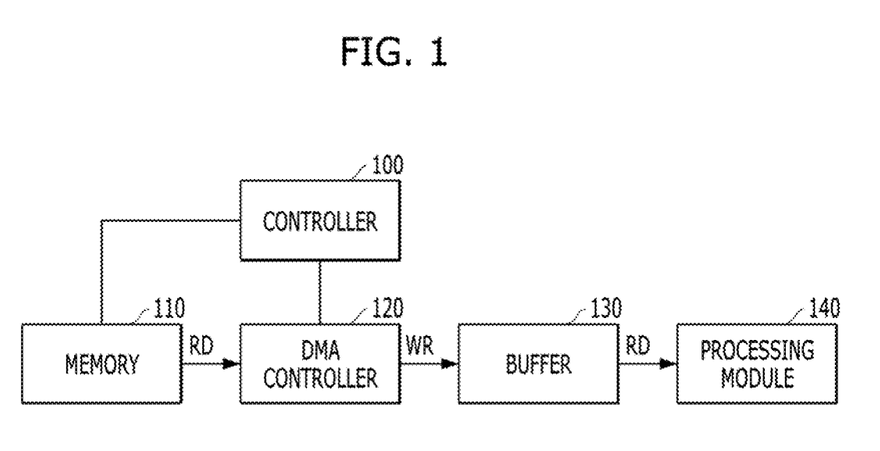
FIG. 1 is a diagram illustrating a memory access apparatus in accordance with various embodiments of the present invention.

FIG. 1 is a diagram illustrating a memory access apparatus n accordance with various embodiments of the present invention.

Referring to FIG. 1, the memory access apparatus may include a controller 100, a memory 110, a direct memory access (DMA) controller 120, a buffer 130 and a processing module 140.

The controller 100 may control an overall operation of the apparatus or system. The controller 100 may control a multi-processing function including a memory access operation by controlling the DMA controller 120. The controller 100 may send control information, including an address range and a search mode for accessing the memory 110, to the DMA controller 120. In some embodiments, the search mode may be a backward search mode or a forward search mode. The memory 110 may store data and output stored data under the control of the controller 100. The DMA controller 120 may be enabled under the control of the controller 100. When a bus grant is received from the controller 100, the DMA controller 120 may access data stored in predetermined address regions of the memory 110. The buffer 130 may buffer data accessed by the DMA controller 120. The processing module 140 may read data buffered in the buffer 130 and process the read data using a predetermined function. The processing module 140 may perform a search function. For example, the processing module 140 may search for data read from the buffer 130 and may send the results of the search to the controller 100.

In general, data transmission in accordance with DMA may be performed in a burst mode. In the burst mode, when reading data (RD) stored in the memory 110 and writing the read data (WR) in the buffer 130, the DMA controller 120 may access burst data using the address of the first data transmitted by the controller 100 at a high speed. Accordingly, the time taken to access data may be reduced because a separate setup time (or addressing time) is not required for the second and subsequent data in a data burst. Burst data stored in the memory 110 may have a specific size. For example the memory 110 may be implemented with a map, table, and a data burst may have a size of 128 bytes. The map table may include a table in which a logical block address (LBA) and a physical block address (PBA) are mapped. For example, the map table may map a logical block address (LBA) and a physical block address (PBA) in a solid state drive (SSD).

The DMA controller 120, the buffer 130 and the processing module 140 in accordance with various embodiments of the present invention may perform a reverse linear search. When the backward search mode is set, the DMA controller 120 and the processing module 140 may manage the buffer 130 as a zigzag buffer. In the following description, the term "backward access" means that data is accessed sequentially in the order of decreasing addresses. The term "forward access" may mean that data is accessed sequentially in the order of increasing addresses.

An apparatus and method in accordance with various embodiments of the present invention may enable backward access by buffering data accessed in the direction in which addresses increase in zigzags when burst data is accessed.

When accessing data stored in the memory 110, the DMA controller 120 may read the data in the sequence of increasing addresses. Accordingly, data accessed by the DMA controller 120 may be data read in the direction in which addresses increase. For example, assuming that a DMA data burst includes 16 data (also referred to as burst data), a backward access method is described below. In such a case, the size of the buffer 130 may be set as a size capable of storing a data burst size of N data or more. If the size of the buffer 130 can store a data burst having N data and backward access is to be performed, the DMA controller 120 may group the data stored in the memory 110 in burst units of N each (N data burst units), may access the data in the sequence of increasing addresses in the group regions, and may store the accessed data in the buffer 130. Furthermore, the DMA controller 120 may write data accessed in each odd-numbered grouping region of the memory 110 in the buffer 130 in a first direction. Moreover, the DMA controller 120 may write data accessed in each even-numbered grouping region of the memory 110 in the buffer 130 in a second direction. Furthermore, when accessing data buffered in the buffer 130, the processing module 140 may read data accessed in each odd-numbered grouping region of the memory 110 into the buffer 130 in the second direction. Moreover, the DMA controller 120 may read data accessed in each even-numbered grouping region of the memory 110 into the buffer 130 in the first direction. That is, the DMA controller 120 may write the data of group regions and read from the memory 110, in the buffer 130 in zigzags. The processing module 140 may read data buffered in the buffer 130, in, a zigzag direction opposite the direction of a write operation. In this case, the first direction may be the direction in which addresses increase, and the second direction may be the direction in which addresses decrease.

For example, if N=16 the grouping region may be a region in which 16 bursts are stored and the buffer 130 may have a size capable of buffering 16 bursts. First, the DMA controller 120 may group data stored in the memory 110 in 16 burst units from the back of the entire address region of the memory 110, may read the data in the direction in which addresses increase in the group regions and may write the read data in the buffer 130. For example, assuming that data having addresses from 0 to 100 have been stored in the memory 110, upon backward access, the DMA controller 120 may read data in 16 bursts units in the direction in which the addresses increase. Hence, in this case, the sequence of the addresses may be (85→100), (69→84) or (53→68). When writing data read as described above in the buffer 130 which is capable of storing a data burst of 16 bursts, the DMA controller 120 may write the data of each odd-numbered group regions in the first direction (e.g., the direction in which the addresses increase), and may write the data of each even-numbered group regions in the second direction (e.g., the direction in which the addresses decrease). Furthermore, the processing module 140 may read the data of each odd-numbered group regions in the second direction and read the data of each even-numbered group regions in the first direction. For example, when the DMA controller 120 reads the data of each odd-numbered group region in the memory 110 and writes the read data in the buffer 130 while increasing the write pointer for the buffer 130 in the sequence of 1→16, the processing module 140 may read data from the buffer 130 while decreasing the read pointer for the buffer 130 in the sequence of 16→1 when the writing of the data in the buffer 130 is completed. That is, the DMA controller 120 may read the data of the group regions of the memory 110 and write the read data in the buffer 130 in zigzags. The processing module 140 may read the data written in the buffer 130 in a zigzag direction opposite to the zigzag direction of the DMA controller 120. Accordingly, in the DMA method in accordance with various embodiments of the present invention, data stored in the sequence of the addresses 1→100 of the memory 110 may be accessed in the sequence of the addresses 100→1 of the memory 110.

Figure 2:
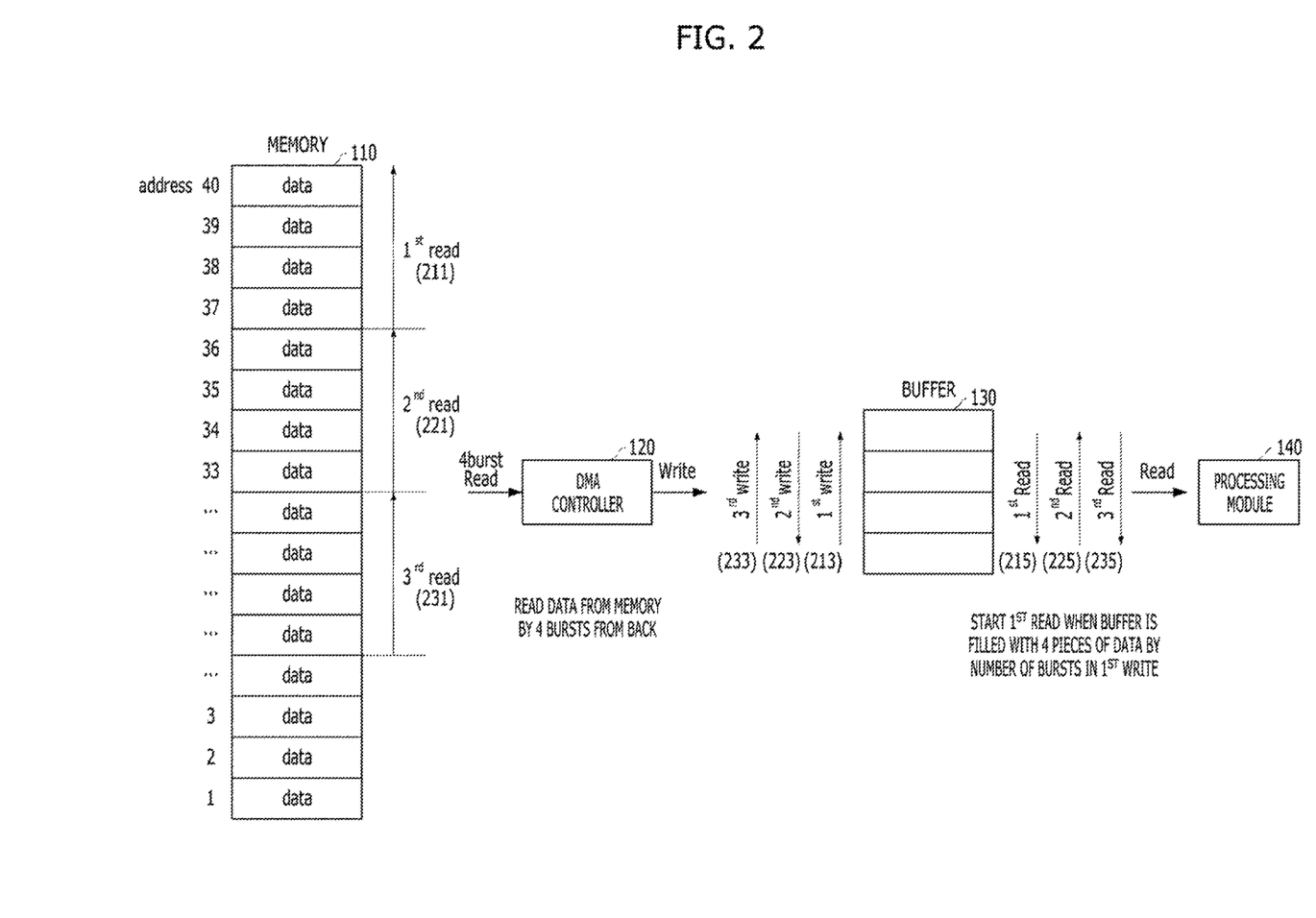
FIG. 2 is a diagram illustrating a direct memory access (DMA) method in accordance with various embodiments of the present invention.

FIG. 2 is a diagram illustrating a direct memory access DMA) method in accordance with various embodiments of the present invention. FIGS. 3A to 3D are diagrams illustrating a backward access operation in accordance with various embodiments of the present invention. For example, FIGS. 3A to 3D illustrate a backward access operation when the DMA method of FIG. 2 is performed.

The size of the buffer 130 for the DMA method may be determined in accordance with a burst size. For example, in the case of a DMA capable of bursts of 16 data size, the buffer 130 may be set as a 16-depth buffer. In the case, of a DMA capable of bursts of 8 data size, the buffer 130 may be set as an 8-depth buffer. In the case of DMA capable of bursts of 4 data size, the buffer 130 may be set as a 4-depth buffer. If a last-in first-out (LIFO) buffer is used when a DMA operation is performed using a backward access method, a double buffering operation (e.g., an operation for forward reading data, first buffering the read data, backward reading the first buffered data and second buffering the backward read data) may have to be performed. As a result, 2 buffers having the same depth may be required. Various embodiments of the present invention may provide an apparatus and method capable of performing a backward access operation while using a single buffer when performing a DMA operation.

In a DMA backward access method in accordance with various embodiments of the present invention, when DMA-accessed data is written in and read from the buffer 130, the write and read operation of the buffer 130 may be controlled in a zigzag manner. To this end, in the DMA backward access method in accordance with various embodiments of the present invention, upon initialization, the locations of the write pointer and read pointer for the buffer 130 may be reset to both ends (e.g., the write pointer=0 and the read pointer=a total buffer depth) of the buffer 130, respectively. Thereafter, data read from the memory 110 may be buffered by controlling the write pointer and read pointer for the buffer 130 in zigzags (e.g., 0→max, max→0, 0→max, . . . ). Furthermore, in a DMA method in accordance with various embodiments of the present invention, control may be performed so that the write pointer for the buffer 130 indicates points at both ends of the buffer 130 and the read for the buffer 130 is not started until the full signal (i.e., an operation for writing, by the DMA controller 120, data at the last point of the buffer 130) of the buffer 130 is generated.

Referring to FIG. 2, it is assumed that the memory 110 has a configuration as shown and the buffer 130 has a 4-burst depth. In this case the DMA controller 120 may read the data of each group region in bursts of 4-burst data each, in the direction in which the addresses increase (i.e., the first direction) as indicated by 211, 221 and 231 which illustrate a first, second and third reads, respectively. Furthermore, when writing data read from the memory 110 in the buffer 130, the DMA controller 120 may perform the write operation in a zigzag manner meaning that the DMA controller 120 may write the data, read as indicated by 211, in the direction in which the addresses increase as indicated by 213, may write the data read as indicated by 221 in the direction in which the addresses decrease as indicated by 223, and may write the data read as indicated by 231 in the direction in which the addresses increase as indicated by 232. Furthermore, when the writing of the data in the buffer 130 is completed (i.e., the buffer 130 is full), the processing module 140 may read the data, written as indicated by 213, in the direction in which the addresses decrease indicated by 215. Also, the processing module 140 may read the data, written as indicated by 223, in the direction in which the addresses increase as indicated by 225. Also, the processing module 140 may read the data, written as indicated by 233, in the direction in which the addresses decrease as indicated by 235.

Hence, as illustrated in the embodiment of FIG. 2, to backward access data that is stored in the memory 110 ranging from the address 40 to the address 1, the DMA controller 120 may group the data in a plurality of regions each region having 4 data, and may then read the data in data bursts, each having a 4-burst size (or length) in the direction in which the addresses increase in each of the regions.

Figure 3A:
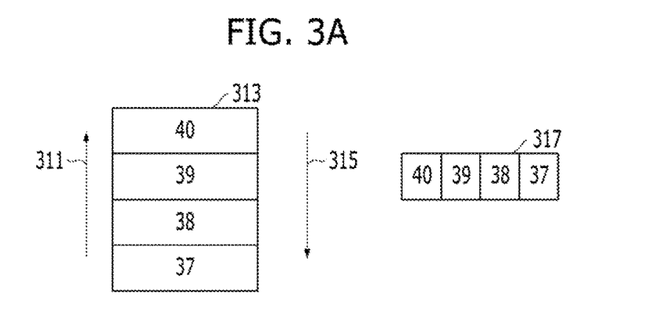
FIGS. 3A to 3D are diagrams illustrating a backward access operation in accordance with various embodiments of the present invention.

Referring to FIG. 3A, the DMA controller 120 of FIG. 1 may write the data of a first group region (i.e., 37, 38, 39 and 40) in the buffer 130 as indicated by 313 by controlling the write pointer for the buffer 130 in the direction in which the addresses increase as indicated by 311. When the writing of the data of the first group region in the buffer 130 is completed as indicated by 313, the processing module 140 may read the written data as indicated by 317 by controlling the read pointer for the buffer 130 in the direction in which the addresses decrease as indicated by 315. That is, the DMA controller 120 may write the data of the first group region in the buffer 130 in the sequence of 37→40, and the processing module 140 may read the written data from the buffer 130 in the sequence of 40→37.

Figure 3B:
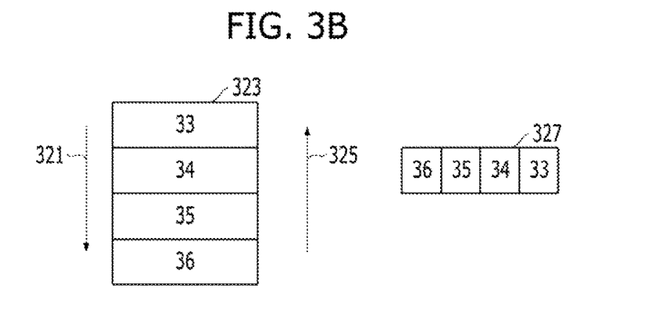

Referring to FIG. 3B, the DMA controller 120 may write the data of a second group region (i.e., 33, 34, 35 and 36 of FIG. 2) in the buffer 130 as indicated by 323 by controlling the write pointer for the buffer 130 in the direction in which the addresses decrease as indicated by 321. When the writing of the data of the second group region in the buffer 130 is completed as indicated by 323, the processing module 140 may read the written data as indicated by 327 by controlling the read pointer for the buffer 130 in the direction in which the addresses increase as indicated by 325. That is the DMA controller 120 may write the data of the second group region in the buffer 130 in the sequence of 33→36 and the processing module 140 may read the written data from the buffer 130 in the sequence of 36→33.

Figure 3C:
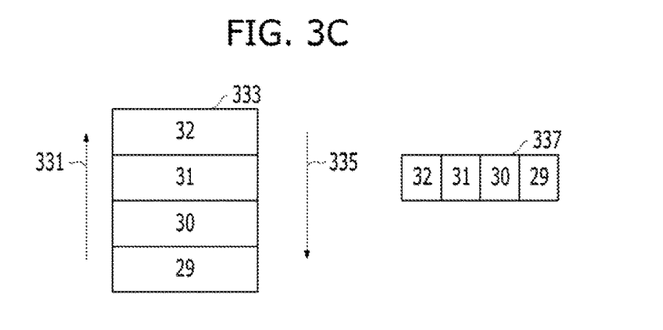
Figure 3D:
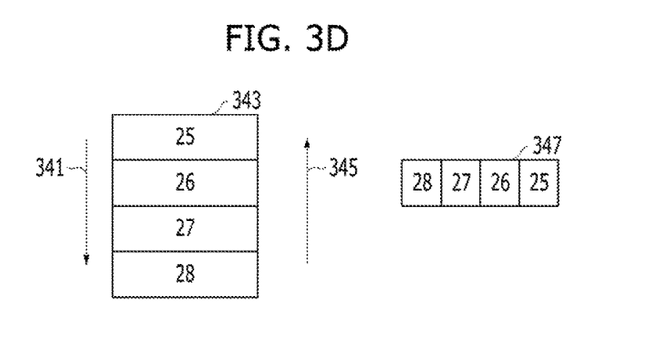

The data of a third group region (i.e., 29, 30, 31 and 32 of FIG. 2) may be accessed using the same procedure as that of FIG. 3C. The data of a fourth group region (i.e., 25, 26, 27 and 28 of FIG. 2) may be accessed using the same procedure as that of FIG. 3D. That is, an access operation for each odd-numbered group region may be performed using a method, such as that of FIGS. 3A and 3C, and an access operation for each even-numbered group region may be performed using a method, such as that of FIGS. 3B and 3D. Hence, if the write and read operation of the buffer 130 are controlled in zigzags as illustrated in FIGS. 3A to 3D, the data of 1→40 stored in the memory 110 may be accessed in the sequence of 40→1.

Figure 4:
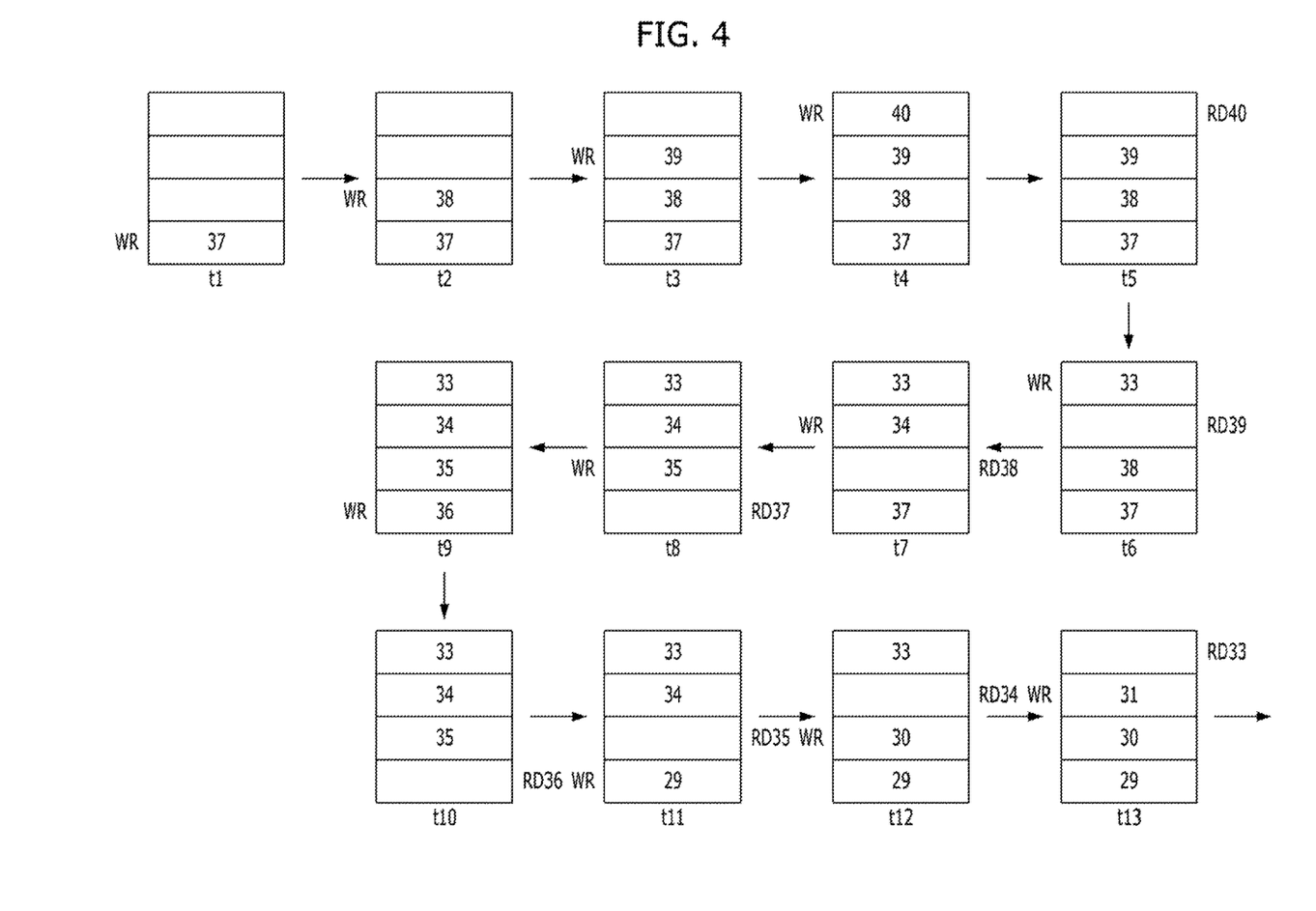
FIG. 4 is a diagram illustrating the timing of a backward access operation in accordance with various embodiments of the present invention.

FIG. 4 is a diagram illustrating timing of a backward access operation in accordance with various embodiments of the present invention. For example, FIG. 4 illustrates an operation for writing and reading data in and from the buffer in a direct memory access (DMA) operation in accordance with various embodiments of the present invention.

Referring to FIG. 4, when data written in the buffer 130 is read, the write pointer for the buffer 130 may be indicative of the end of the buffer 130 (i.e., the lowest pointer location or highest pointer location of the buffer 130). The read operation may be prevented until a buffer full signal is generated (i.e., the buffer 130 is full). When the buffer full signal is generated, the read operation may be started from the end location of the buffer 130. That is, when the buffer 130 becomes full, i.e., is in a buffer full state, the DMA controller 120 may perform a data write operation and at the same time, the processing module 140 may perform a data read operation. At points of time t1 to t3, the DMA controller 120 may write data in the buffer 130, and the processing module 140 may not perform a data read operation because the buffer 130 is not in a buffer full state. At a point of time t4, the DMA controller 120 may write data (e.g., "40") at the last pointer (i.e., the highest write pointer) location of the buffer 130 and generate a buffer full signal. When the buffer full signal is generated, the processing module 140 may locate the read pointer at the last pointer for the buffer 130 (i.e., RD40) and read the data (e.g., "40") at a point of time t5. Thereafter, at points of time t6 to t8 the processing module 140 may sequentially read data "39", "38" and "37" while decreasing the read pointer (i.e. RD39→RD38→RD37). The DMA controller 120 may sequentially write the data "33", "34" and "35" of a next group region while decreasing the write pointer.

At a point of time t9, the DMA controller 120 may write data (e.g., "36") at the last pointer (i.e., the lowest write pointer) location of the buffer 130 and generate a buffer full signal. When the buffer full signal is generated, the processing module 140 may locate the read pointer at the lowest last pointer for the buffer 130 (i.e., RD36) and read data (e.g., "36") from the buffer 130 at a point of time t10. Thereafter, at points of time t11 to t13, the processing module 140 may sequentially read the data "35", "34" and "33" while increasing the read pointer, and the DMA controller 120 may sequentially write the data "29", "30" and "31" of a next group region while increasing the write pointer. Thereafter, the DMA controller 120 may read the data of a next group region from the memory 110 and write the read data in the buffer 130.

In accordance with various embodiments of the present invention, a data read operation and a data write operation may be performed on the buffer 130 at the same time. That is, when the processing module 140 reads data written in the buffer 130, the DMA controller 120 may read data of a next group region from the memory 110 and write the read data in the buffer 130. Accordingly, when a DMA operation is performed, a backward access operation can be performed rapidly.

Figure 5:
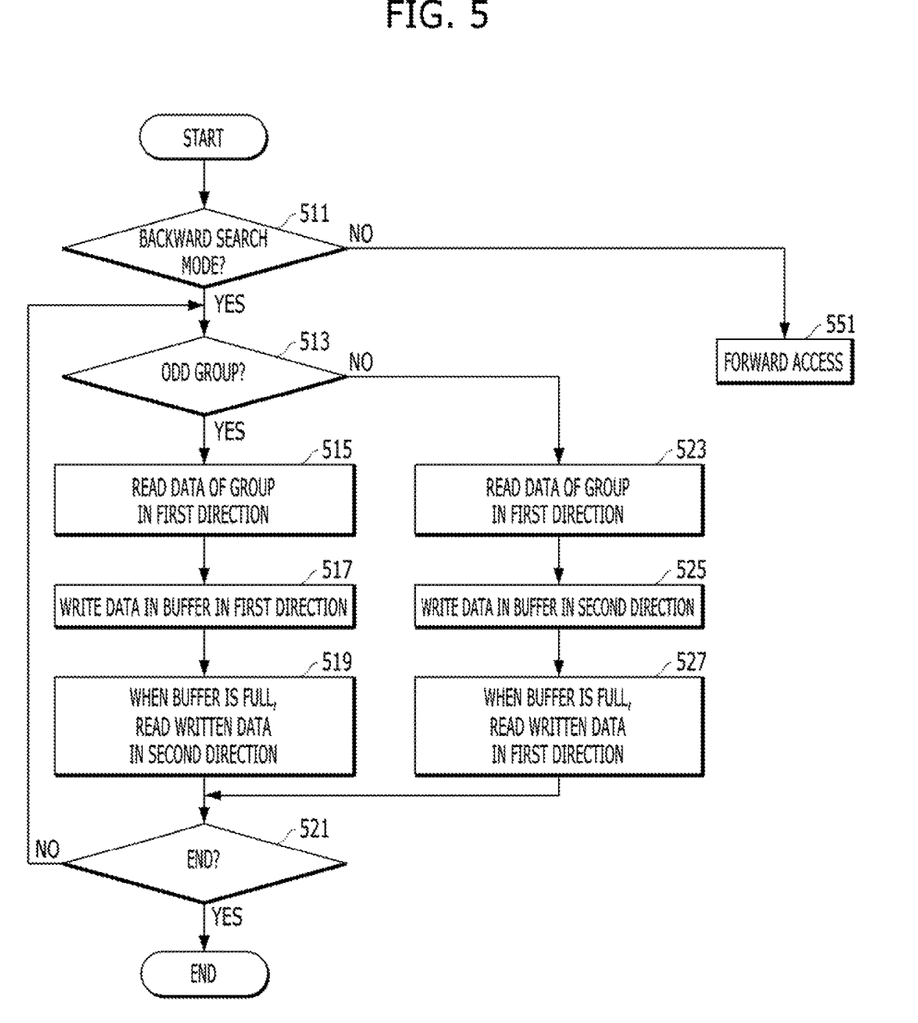
FIG. 5 is a flowchart illustrating a direct memory access (DMA) operation in accordance with various embodiments of the present invention.

FIG. 5 is a flowchart illustrating a direct memory access (DMA) operation procedure in accordance with various embodiments of the present invention.

Referring to FIG. 5, if a search mode is a backward search mode at step 511, a DMA apparatus may recognize the backward search mode. The DMA apparatus may include the DMA controller 120, the buffer 130 and the processing module 140 as shown in FIG. 1. If it is determined that the search mode is the backward search mode (step 511, YES), the DMA apparatus may analyze a group to be read from the memory 110 of FIG. 1 at step 513. In this case, if, as a result of the analysis, it is found that the group to be read is an odd group (step 513, YES), the DMA apparatus may read the data of a corresponding group of the memory in a first direction at step 515, and may write the data read from the memory in the buffer in the first direction at step 517. In this case, the first direction may be the direction in which addresses increase. Furthermore, when the write operation for the buffer 130 is completed (i.e., the buffer 130 is full), the DMA apparatus may read the data written in the buffer 130 in a second direction at step 519. In this case, the second direction may be the direction in which the addresses decrease. Furthermore, if the search mode is the backward search mode (step 511, YES) and the DMA apparatus recognizes that a group to be read from the memory is an even group at step 513 (NO), the DMA apparatus may read the data of a corresponding group of the memory 110 in the first direction at step 523, and may write the data read from the memory 110 in the buffer 130 in the second direction at step 525. Furthermore, when the write operation for the buffer 130 is completed (i.e., the buffer 130 is full), the DMA apparatus may read the data written in the buffer 130 in the first direction at step 527.

In the DMA method in accordance with various embodiments of the present invention, the data of a corresponding group of the memory 110 may be read in the first direction. If a group to be read is an odd-numbered group, the read data may be written in the buffer 130 in a first direction. When the write operation for the buffer 130 is completed, the written data may be read in a second direction and output. In contrast, if a group to be read is an even-numbered group, data read from the memory 110 may be written in the buffer 130 in the second direction. When the write operation for the buffer 130 is completed, the data written in the buffer 130 may be read in the first direction and output. In this case, the first direction may be a backward direction in which the pointer for the buffer 130 increases, the second direction may be a forward direction in which the pointer for the buffer 130 decreases, and the buffer 130 may have the number (depth) of bursts that form a group of the memory 110.

If all of data stored in the memory 110 are accessed while repeating the above operation, the DMA apparatus may recognize such an operation at step 521 and terminate the DMA backward access operation.

Furthermore, if a search mode is a forward search, n ode at step 511 (NO), the DMA apparatus may perform a forward access operation at step 551. In the case of the forward access mode, the DMA apparatus may sequentially read data from the memory 110 in the direction in which addresses increase, and may sequentially store the read data in the buffer 136 while increasing the write pointer for the buffer 130. Furthermore, when the write operation for the buffer 130 is completed, the DMA apparatus may read the stored data while sequentially increasing the read pointer, and may output the read data.

Figure 6:
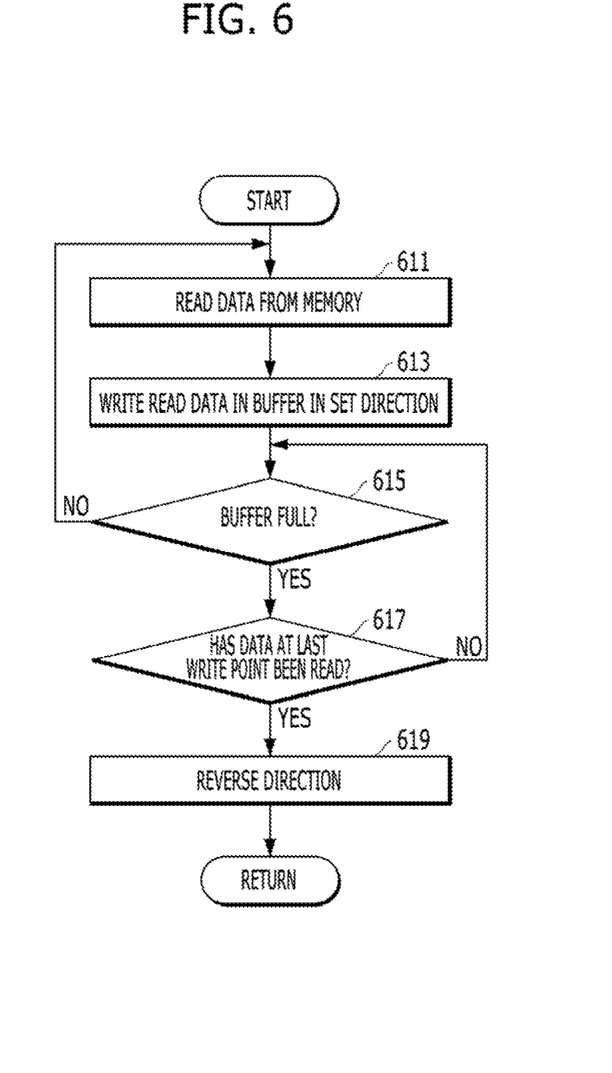
FIG. 6 is a flowchart illustrating a buffering operation of a direct memory access (DMA) operation in accordance with various embodiments of the present invention.

FIG. 6 is a flowchart illustrating a buffering operation of a direct memory access (DMA) operation in accordance with various embodiments of the present invention.

Referring to FIG. 6, the DMA apparatus may read the data of a current group from the memory 110 of FIG. 1 at step 611, and may write the read data in the buffer 130 in a predetermined direction at step 613. In this case, the DMA apparatus may read the data from the memory while repeating steps 611 and 613 until the buffer 130 becomes a buffer full state, and may write the read data in the buffer 130. In this case, when writing the data of the current group in the buffer 130, the DMA apparatus may read the data of a previous group which has been written in the buffer 130. Thereafter, when the buffer 130 becomes a buffer full state, the DMA apparatus may recognize the buffer full state at step 615 and check whether the first data (e.g., data written at the last write pointer location) of the current group on which the write operation has been completed has been read at step 617. If, as a result of the check, it is found that the first data of the current group has not been read, the DMA apparatus may not perform a write operation until the first data of the current group is read. If, as a result of the check it is found that the data written at the last write pointer location of the current group has been read, the DMA apparatus may change the direction of the write pointer at step 619, may return and may store the data of a next group.

The DMA apparatus in accordance with various embodiments of the present invention may write data of a group unit, read from the memory 110 in the backward access mode, in the buffer 130 in the first direction, and may read the written data in the second direction after the data is written. In this case, when data written at the last write pointer location of a group in which data has been written in the first direction is read, the DMA apparatus may reverse the direction of the write pointer and start an operation for writing data read from the memory 110 in the buffer 130 in the second direction. In this case, the last write pointer location of a previous group may be a start write pointer location in a next group. In such a case, the DMA apparatus may write the data of a next group at a location from which data has been read in the second direction while reading the data in the second direction. That is, the DMA apparatus may sequentially read the data of a set group region from the memory 110 in the direction in which addresses increase, may write the read data in the buffer 130 in zigzags, and may read the written data in a reverse zigzag direction.

The DMA apparatus and method in accordance with various embodiments of the present invention may be used in the linear search hardware module of a memory system. The linear search hardware module of the memory system may search for data stored in memory in a direction opposite the direction in which the data has been stored. In accordance with various embodiments of the present invention, in the linear search hardware module of a memory system, backward search may be implemented using DMA. The linear search hardware module may perform a DMA operation. In DMA, when data stored in memory is read in bursts, the linear search hardware module including a buffer may search for data while controlling the write pointer and read pointer for the buffer in a zigzag direction and a reverse zigzag direction.

In various embodiments of the present invention, the memory may store a map table. When the map table is managed as a physical to logical (P2L) table in the flash translation layer (FTL) of a memory system, update information about the P2L table may be sequentially accumulated (or may be stored) in the forward direction of addresses (i.e., the direction in which the addresses increase) in memory. In this case, when the FTL tries to search for specific data at any point of time, backward search may be required. For example, if data to be searched for is the recently updated data, it will be effective to search for the data in a sequence opposite a sequence in which the data has been updated in the map table. In such a case, the linear search hardware module of the memory system may search for the recent updated data through reverse search. For example, in the map table, a single burst may have a size of 128 bytes and include two pairs of physical block addresses (PEAS) and logical block addresses (LBAs).

The linear search hardware module of a memory system in accordance with various embodiments of the present invention may provide an apparatus and method capable of accessing data stored in a buffer in an address backward direction (i.e., the direction in which addresses decrease from the back) while controlling the write pointer and read pointer for the buffer for buffering read data in zigzags when searching the map table for the data in a DMA burst by reading the data.

Figure 7:
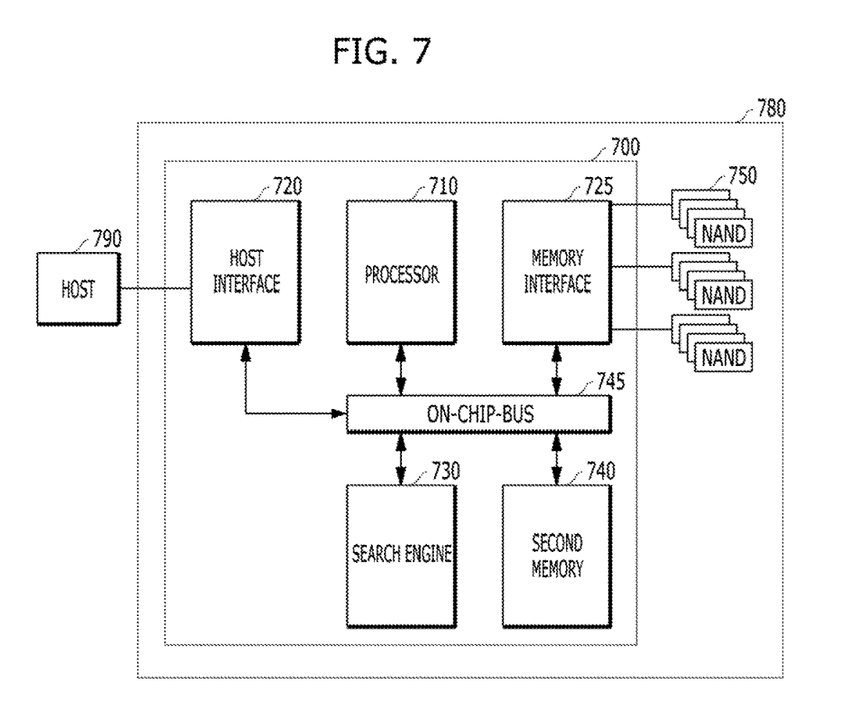
FIG. 7 is a diagram illustrating a data processing system including a memory system in accordance with an embodiment of the present invention.

FIG. 7 is a diagram showing an example of a data processing system including a memory system in accordance with an embodiment of the present invention.

Referring to FIG. 7, the data processing system may include a host 790 and a memory system 780. The memory system 780 may include a controller 700 and first memory 750.

The host 790 may be an electronic device. The electronic device may include at least one of a smart phone, a tablet PC, a mobile phone a video telephone, an e-book reader, a desktop PC, a laptop PC, a netbook computer, a workstation, a server, a PDA, a portable multimedia player (PMP), an MP3 player, a medical device, a camera and a wearable device.

The memory system 780 may operate in response to a request from the host 790 and may store data accessed by the host 790. The memory system 780 may be used as the primary storage device or secondary storage device of the host 790. In this case, the memory system 780 may be implemented using any one of a variety of types of storage devices depending on a host interface protocol coupled to the host 790. For example, the memory system 780 may be implemented using any one of a variety of types of storage devices, such as a solid state drive (SSD), a multi-media card (MMC) of an MMC, embedded MMC (eMMC), reduced size MMC (RS-MMC) or micro-MMC form, a secure digital (SD) card of an SD, mini-SD or micro-SD form, a universal storage bus (USB) storage device, a universal flash storage (UFS) device, a compact flash (CF) card, a smart media card and a memory stick.

Furthermore, storage devices that implement the memory system 780 may be implemented using volatile memory devices such as dynamic random access memory (DRAM) and static RAM (SRAM), and non-volatile memory devices, such as read only memory (ROM), mask ROM (MROM), programmable ROM (PROM), erasable ROM (EPROM), electrically erasable ROM (EEPROM), ferromagnetic ROM (FROM), phase change RAM (PPRAM), magnetic RAM (MRAM), resistive RAM (RRAM) and flash memory.

Furthermore, the memory system 780 may include the first memory 750 configured to store data accessed by the host 790 and the controller 700 may be configured to control the storage of data in the first memory (or memory device) 750.

In this case, the controller 700 and the first memory 750 may be integrated into a single semiconductor device. For example, the controller 700 and the first memory 750 may be integrated into a single semiconductor device to form an SSD.

The controller 700 and the first memory 750 may be integrated into a single semiconductor device to form a memory card. For example, the controller 700 and the first memory 750 may be integrated into a single semiconductor device to form a memory card, such as a PC card (e.g., personal computer memory card international association (PCMCIA)), a compact flash card (CF), a smart media card (e.g., SM or SMC), a memory stick, a multimedia card (e.g., MMC, RS-MMC or MMCmicro), an SD card (e.g., SD, miniSD, microSD or SDHC) or universal flash storage (UFS).

The first memory 750 may retain data stored therein although power is not supplied thereto. More specifically, the first memory 750 may store data provided by the host 790 through a write operation, and may provide data stored through a read operation to the host 790. The first memory 750 may be flash memory such as NAND type flash memory. The flash memory may have a three-dimensional stack structure.

In accordance with one embodiment, the controller 700 may be the controller of an electronic device. In accordance with one embodiment, the controller 700 may be a solid state drive (SSD) coupled to the host 790. If the controller 700 is an SSD, the memory system 780 may be configured to write program data, supplied by an external device (e.g., the host 790), in the memory device 750 in response to a write (or program) request from the external device. Furthermore, the memory system 780 may be configured to provide data, written in the memory device 750, to the external device in response to a read request from the external device.

For example, FIG. 7 shows an example of the configuration of an SSD device. Referring to FIG. 7, the controller 700 may include a processor 710, a host interface 720, a memory interface 725, a search engine 730, a second memory 740 and an on-chip bus 745.

The host interface 720 may perform an interface function between the controller 700 and the host 790. The memory interface 725 may perform an interface function between the controller 700 and the memory device 750.

The second memory 740 may include a buffer memory and/or a map table. The buffer memory may be a memory configured to buffer data to be written in the first memory 750 or data to be read from the second memory 750. The map table may be a table in which a logical block address (LBA) of a host region is mapped to a physical block address (PBA) of the first memory 750. The second memory 740 may include a dynamic random access memory (DRAM) and/or a static random access memory (SRAM). The map table may be stored in the SRAM so that it can be maintained upon power-off.

The processor 710 may control an overall operation of the memory system 780. The processor 710 may control an operation for storing data in the memory device 750 in response to a write request from the host 790, reading data written in the memory device 750 in response to a read request from the host 790, and outputting the read data to the host 790.

The search engine 730 may include a DMA controller, a buffer and a linear search hardware module. The search engine 730 may include a configuration, such as that of FIG. 1. The search engine 730 may perform a function for searching the map table of the second memory 740 for data through backward access in the backward search mode under the control of the processor 710. The search engine 730 in accordance with various embodiments of the present invention may search for an LBA and/or a PBA by accessing information stored in the map table forward or backward under the control of the processor 710, and may provide the results of the search to the processor 710.

Figure 8:
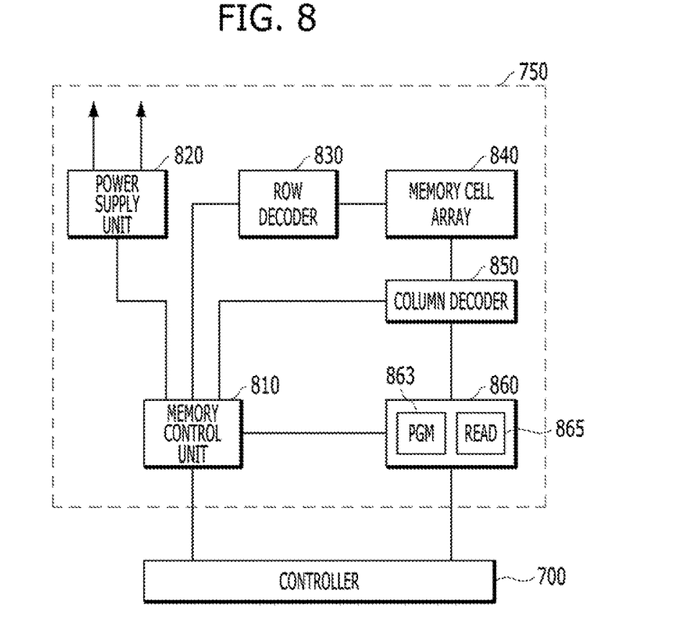
FIG. 8 is a diagram illustrating a configuration of a memory device in accordance with various embodiments of the present invention.

FIG. 8 is a diagram showing the memory device (e.g., 750 of FIG. 7) in accordance with various embodiments of the present invention.

Referring to FIG. 8, the memory device 750 may include a memory control unit 810, a power supply unit 820, a row decoder 830, a memory cell array 840, a column decoder 850 and a program/read circuit 860.

The memory device 750 may be a flash memory device, such as NAND flash or NOR flash, ferroelectrics random access memory (FeRAM) phase-change random access memory (PCRAM), magnetic random access memory (MRAM) or resistive random access memory (ReRAM). In the following description, the memory device 750 may be described as being a NAND flash, that is, a non-volatile memory device.

The memory cell array 840 is coupled to a plurality of word lines WL and a plurality of bit lines BL. Furthermore, the memory cell array 840 may include a plurality of memory cells each disposed at a region in whish each of the plurality of word lines WL and the plurality of bit lines BL are intersected. The memory cell array 840 may receive an address ADDR for indicating a memory cell to be accessed in accordance with a command CMD. The address ADDR may include a row address X_ADDR for selecting a word line WL of the memory cell array 840 and a column address Y_ADDR for selecting a bit line of the memory cell array 840.

The row decoder 830 is coupled to the memory cell array 840 through the word lines WL and may select at least one of the word lines in response to a row address X_ADDR. The column decoder 850 is coupled to the memory cell array 840 through the bit lines BL, and may select at least one of the bit lines in response to a column address Y_ADDR.

The program read circuit 860 may include a program circuit (PGM) 863 and a read circuit 865. The program circuit 863 is coupled to a selected bit line BL through the column decoder 850, and may perform program operation (i.e., data write operation) by providing a program pulse to a selected memory cell of the memory cell array 840. The read circuit 865 is coupled to a selected bit line BL through the column decoder 850, and may sense the level of a selected memory cell of the memory cell array 840 and read (or output) stored data. Furthermore, the read circuit 865 may output data to the outside of the memory device 750, for example, to the controller 700 of FIG. 7.

The power supply unit 820 may generate a variety of types of voltages for performing a program, read or erase operation on the memory cell array 840 based on control of the voltage of the memory control unit 810. Furthermore, the power supply unit 820 may generate driving voltages (or bias voltages) for driving the plurality of word lines WL and bit lines BL for example, a set program voltage, a reset voltage, a read voltage and a block voltage.

The memory control unit 810 may output voltage control signals for programming data into the memory cell array 840 or reading data from the memory cell array 840 to the power supply unit 820 based on a command CMD, an address ADDR and a control signal CTRL received from the controller 700. Furthermore, operating control signals transmitted from the memory control unit 810 to the controller 700 may be provided to the program/read circuit 860, the power supply unit 820, the row decoder 830 and the column decoder 850. The memory control unit 810 may generally control operations within the memory device 750.

Figure 9:
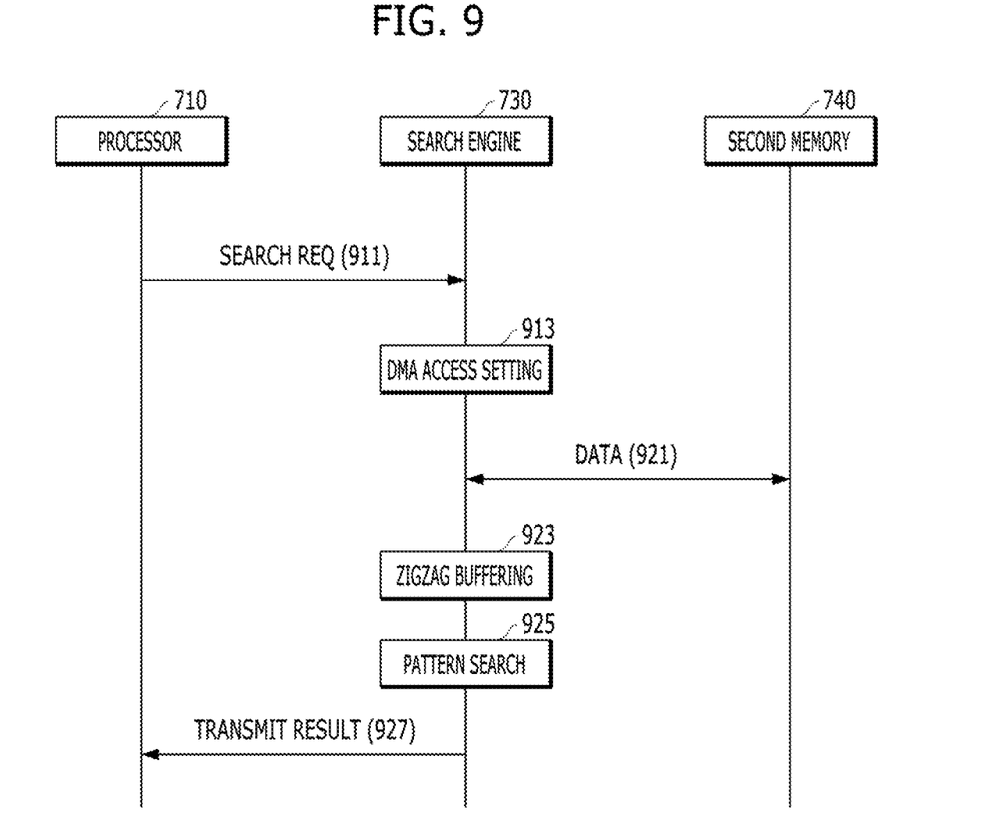
FIG. 9 is a diagram illustrating an operation for searching a map table in accordance with various embodiments of the present invention.

FIG. 9 is a diagram illustrating an operation for searching a map table in accordance with various embodiments of the present invention.

Referring to FIG. 9, the map table may be a table in which the logical block addresses (LBAs) of the host 790 of FIG. 7 and the physical block addresses (PBAs) of the first memory 750 are stored. The map table may be stored in a second memory 740 (e.g., SRAM) for fast access, and may also be stored in the first memory 750 in preparation for power off. In such a case, when power is off, the map table stored in the first memory 750 may be loaded onto the second memory 740 and stored therein. The map table may be changed when the controller 700 accesses (e.g., data write) the first memory 750 or due to erase, garbage collection or wear leveling under the control of the host 790. That is, when a change in the storage state of the first memory 750 is generated, the controller 700 may update the map table of the second memory 740 with a changed LBA and/or PBA.

The controller 700 may search the map table of the second memory 740 in order to check the state of the first memory 750. When managing the map table in the FTL, the controller 700 may sequentially store updated information in the address forward direction of the map table. For example, the controller 700 may store updated address information while increasing the addresses of the map table. In this case, the controller (e.g., FTL) 700 may search for specific data of the map table at any point of time. If data to be searched for is the recently updated data when the map table is searched, it will be effective to search for the data in a sequence opposite to the sequence in which the data has been updated. In other words, the controller 700 may backward search for data stored in the map table of the second mer memory 740.

At step 911, the processor 710 may transmit search request information SEARCH REQ to the search engine 730. The search request information may include information about an address of the map table of the second memory 740 (e.g., search region information), a search direction (i.e., backward search or forward search) and a search pattern (i.e. an LBA and/or a PBA). At step 913, the search engine 730 that has received the search request information may set a search direction. For example, if the search direction is backward search, the search engine 730 may set a backward DMA method. At step 913, the search engine 730 may set a search region of the map table based on the address information included in the search request information, and may set group regions in which the data of the set search region is to be accessed. Each group region may be set to have a size equaling the depth size of a buffer (e.g., the buffer 130 of FIG. 1) as indicated by 211 to 213 of FIG. 2.

Thereafter, at step 921, the search engine 730 may read data from the map table of the second memory 740. In this case, the data may be sequentially read in a first direction (e.g., the direction in which addresses increase in the selected group region) in the selected group region. When data at the last address location of the selected group region is read, the search engine 730 may select a next group region of the map table and read data while increasing the addresses of the selected next group region in the first direction.

At step 923, the search engine 730 may buffer data, read from the map table of the second memory 740, in the buffer by controlling the buffer 130 of FIG. 1 in zigzags. The operation of steps 921 and 923 performed by the search engine 730 may be performed using a method, such as that shown in FIGS. 2 to 4, and an operating procedure thereof may be performed according to a procedure, such as that of FIGS. 5 and 6.

For example, a DMA controller (e.g., the DMA controller 120 of FIG. 1) may write data, read from an odd-numbered group region of the map table, in a buffer (e.g., the buffer 130 of FIG. 1) in a first direction (i.e., the direction in which addresses increase or a forward direction). Also, the DMA controller may write data, read from an even-numbered group region of the map table, in the buffer in a second direction (i.e., the direction in which the addresses decrease or a backward direction). Furthermore, a linear search hardware module (e.g., the processing mode e 140 of FIG. 1) may read the data of an odd group, written in the buffer, in the second direction (i.e., the direction in which the addresses decrease or the backward direction). Also, the linear search hardware module may read the data of an even group in the first direction (i.e., the direction in which addresses increase or the forward direction).

Furthermore, the search engine 730 may search for data read from the buffer at step 925. If the data of a search pattern requested by the processor 710 is searched for, the search engine 730 may transmit the retrieved data to the processor 710.

An access method of the DMA apparatus in accordance with various embodiments of the present invention may include a step of setting group regions in which the data of memory is to be read, a first access step of reading the data of a corresponding group region from the second memory in the first direction if a set group region is an odd-numbered group region writing the read data in the buffer in the first direction and reading the data of an odd-numbered group region written in the buffer in the second direction, and a second access step of reading the data of a corresponding group region from the second memory in the first direction if the set group region is an even-numbered group region, writing the read data in the buffer in the second direction, and reading the data of an even-numbered group written in the buffer in the first direction. In this case, the first direction may be a forward direction in which the pointer for the buffer increases, and the second direction may be a backward direction in which the pointer for the buffer decreases.

The buffer may have a size identical with the group region size of the memory. Furthermore the first access step or the second access step may include writing data while changing the write pointer for the buffer in a set direction, generating a buffer full signal when data write for the buffer is completed and setting the set direction as a reverse direction, and reading the data of the buffer in a direction opposite the write direction of DMA when the buffer full signal is recognized. The writing of the data may include reversing the direction of the write pointer for the buffer when the data of the buffer is read after the buffer full signal is output and resuming data write for the buffer in the set direction.

As described above, the size of the DMA buffer in the DMA apparatus may be determined depending on a DMA burst length. When data stored in memory is to be backward accessed, a double buffering operation has to be performed using an LIFO buffer. Accordingly, two buffers having the same depth may be required. The DMA apparatus and method in accordance with embodiments of the present invention may enable backward access by controlling the write and read of the buffer in zigzags when buffering DMA data in a burst read operation. Accordingly, the DMA apparatus and method in accordance with various embodiments of the present invention have advantages in that it enable backward access using a single buffer and thus can reduce a buffer size.

Although various embodiments have been described for illustrative purpose, it will be apparent to those skilled in the art that various changes and modifications may be made without departing from the spirit and scope of the invention as defined in the following claims.

What is claimed is:

1. A memory control apparatus for controlling a first memory under a control of a host, comprising:
   a second memory;
   a processor suitable for providing a search request for data stored in second memory; and
   a search engine suitable for backward searching for the data stored in the second memory based on the data for the search request,
   wherein the search engine comprises:
   a buffer;
   a direct memory access (DMA) controller suitable for setting group regions from which the data of the second memory is to be read in response to the search request, reading data of each odd-numbered group region in a first direction and writing the read data of each odd-numbered group region in the buffer in the first direction, and reading data of each even-numbered group region in the first direction and writing the read data of each even-numbered group region in the buffer in a second direction; and
   a linear search hardware module suitable for reading the data of each odd-numbered group region written in the buffer in the second direction, reading the data of each even-numbered group region written in the buffer in the first direction, analyzing the read data, and transmitting a result of the search to the processor,
   wherein the first direction is one direction among addresses increasing direction and addresses decreasing direction, and the second direction is an opposite direction to the first direction.

2. The memory control apparatus of claim 1, wherein the first direction is a forward direction in which a pointer for the buffer increases and the second direction is a backward direction in which the pointer for the buffer decreases.

3. The memory control apparatus of claim 2, wherein:
   the second memory includes a map table in which a logical block address of the host and a physical block address of the first memory are mapped, and
   the data for the search request comprises data of the map table.

4. The memory control apparatus of claim 3, wherein the data for the search request comprises information regarding reverse linear search, information about a search location of the map table and a search pattern.

5. The memory control apparatus of claim 4, wherein:
   the search pattern comprises logical block address data or physical block address data, and
   the linear search hardware module is suitable for analyzing data accessed from the buffer and transmitting data identical with the search pattern to the processor.

6. The memory control apparatus of claim 3, wherein:
   the DMA controller is suitable for writing data in the buffer while changing a write pointer for the buffer in a predetermined direction, generating a buffer full signal when the writing of the data in the buffer is completed, and setting the set direction as a reverse direction, and
   the linear search hardware module is suitable for reading the data of the buffer in a direction opposite the write direction of the DMA controller in response to the buffer full signal.

7. The memory control apparatus of claim 6, wherein the buffer has a size identical with a data size of the group region.

8. A direct memory access (DMA) apparatus, comprising:
   a memory;
   a buffer;
   a DMA controller suitable for setting group regions from which data of the memory is to be read, reading data of each odd-numbered group region in a first direction and writing the read data of each odd-numbered group region in the buffer in the first direction, and reading data of each even-numbered group region in the first direction and writing the read data of each even-numbered group region in the buffer in a second direction; and
   a read module suitable for reading the data of each odd-numbered group region written in the buffer in the second direction and reading the data of each even-numbered group region in the first direction,
wherein the first direction is one direction among addresses increasing direction and addresses decreasing direction, and the second direction is an opposite direction to the first direction.

9. The DMA apparatus of claim 8, wherein the first direction is a forward direction in which a pointer for the buffer increases and the second direction is a backward direction in which the pointer for the buffer decreases.

10. The DMA apparatus of claim 9, wherein the buffer has a size identical with a group region size of the memory.

11. The DMA apparatus of claim 10, wherein:
the DMA controller is suitable for writing data in the buffer while changing a write pointer for the buffer in a predetermined direction, generating a buffer full signal when the writing of the data in the buffer is completed, and setting the predetermined direction as a reverse direction, and
the read module is suitable for reading the data of the buffer in a direction opposite the write direction of the DMA controller in response to the buffer full signal.

12. The DMA apparatus of claim 11, wherein the DMA controller is suitable for:
reversing a direction in which the write pointer for the buffer proceeds when the data of the buffer is read by the read module after generating the buffer full signal, and
resuming a write of data in the buffer in the set direction.

13. An operating method of a memory control apparatus comprising a second memory and controlling an operation of a first memory in response to a request from a host, the operating method comprising:
a step of setting group regions from which data of the second memory is to be read based on search request data of the second memory;
a first access step of reading data of a corresponding group region from the second memory in a first direction, writing the read data in the buffer in the first direction, and reading data of an odd-numbered group region written in the buffer in a second direction if the corresponding group region is an odd-numbered group region;
a second access step of reading data of a corresponding group region from the second memory in the first direction, writing the read data in the buffer in the second direction, and reading data of an even-numbered group written in the buffer in the first direction if the corresponding group region is an even-numbered group region; and
a search step of analyzing the read data and transmitting a result of the search,
wherein the first direction is one direction among addresses increasing direction and addresses decreasing direction, and the second direction is an opposite direction to the first direction.

14. The operating method of claim 13, wherein the first direction is a forward direction in which a pointer for the buffer increases and the second direction is a backward direction in which the pointer for the buffer decreases.

15. The operating method of claim 14, wherein:
the second memory comprises a map table in which a logical block address of the host and a physical block address of the first memory are mapped, and
the search request data comprises data of the map table.

16. The operating method of claim 15, wherein the search request data comprises information regarding reverse linear search, information about a search location of the map table and a search pattern.

17. The operating method of claim 16, wherein:
the search pattern comprises logical block address data or physical block address data, and
the search step comprises analyzing data accessed from the buffer and transmitting data identical with the search pattern.

18. The operating method of claim 15, wherein the first access step or the second access step comprises:
writing data in the buffer while changing a write pointer for the buffer in a predetermined direction;
generating a buffer full signal when the writing of the data in the buffer is completed and setting the predetermined direction as a reverse direction; and
reading the data of the buffer in a direction opposite a direction in which the data is written when the buffer full signal is recognized.

19. The operating method of claim 18, wherein the buffer has a size identical with a data size of the group region.

* * * * *